United States Patent
Soltwedel et al.

(10) Patent No.: US 11,580,630 B2
(45) Date of Patent: Feb. 14, 2023

(54) PRINTED IMAGE INSPECTION METHOD WITH DEFECT CLASSIFICATION

(71) Applicant: Heidelberger Druckmaschinen AG, Heidelberg (DE)

(72) Inventors: Frank Soltwedel, Sinsheim/Hoffenheim (DE); Robert Mueller, Moerlenbach (DE); Jan Krieger, Heidelberg (DE); Frank Schumann, Heidelberg (DE); Peter Eisele, Oestringen (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 192 days.

(21) Appl. No.: 17/167,379

(22) Filed: Feb. 4, 2021

(65) Prior Publication Data

US 2021/0287353 A1    Sep. 16, 2021

(30) Foreign Application Priority Data

Mar. 11, 2020    (EP) .................................... 20162299

(51) Int. Cl.
*G06T 7/00* (2017.01)
*B41F 33/00* (2006.01)

(52) U.S. Cl.
CPC .......... *G06T 7/001* (2013.01); *B41F 33/0036* (2013.01); *G06T 2207/30144* (2013.01)

(58) Field of Classification Search
CPC ........... G06T 7/001; G06T 2207/30144; B41F 33/0036
See application file for complete search history.

(56) References Cited

U.S. PATENT DOCUMENTS

| 7,570,797 | B1 | 8/2009 | Wang et al. |
| 7,813,541 | B2* | 10/2010 | Sali .................. G01N 21/95607 |
| | | | 382/145 |
| 2008/0212844 | A1 | 9/2008 | Turke et al. |
| 2009/0188405 | A1 | 7/2009 | Stiel |
| 2009/0238441 | A1* | 9/2009 | Yamashita .............. G06T 7/001 |
| | | | 382/144 |

(Continued)

FOREIGN PATENT DOCUMENTS

| DE | 102017216260 A1 | 3/2019 |
| JP | 2005205797 A | 8/2005 |

*Primary Examiner* — Pinalben Patel
(74) *Attorney, Agent, or Firm* — Laurence A. Greenberg; Werner H. Stemer; Ralph E. Locher

(57) ABSTRACT

A method of inspecting images on printed products by a computer in a printing machine. Printed products are recorded and digitized by an image sensor of an image inspection system in the course of the image inspection process, and the computer compares them to a digital reference image. If deviations are found, the defective printed products are removed. The computer analyzes the deviations found in the course of the image inspection process together with further data from other system parts and from the machine, determines specific defect classes and the causes thereof based on the defects by machine learning processes, assigns the defects found in the image inspection process to the defect classes in a corresponding way, and displays the classified detected defects with their defect classes and causes to an operator of the machine so that the operator can initiate specific measures to eliminate the defect causes.

11 Claims, 3 Drawing Sheets

(56) References Cited

U.S. PATENT DOCUMENTS

2011/0044528 A1\* 2/2011 Tsuchiya ................. G06T 7/001
  382/144
2015/0273816 A1 10/2015 Schumann et al.
2018/0005370 A1\* 1/2018 Kitada ....................... G06T 7/90

\* cited by examiner

PRINTED IMAGE INSPECTION METHOD WITH DEFECT CLASSIFICATION

CROSS-REFERENCE TO RELATED APPLICATION

This application claims the priority, under 35 U.S.C. § 119, of European patent application EP 20162299.0, filed Mar. 11, 2020; the prior application is herewith incorporated by reference in its entirety.

BACKGROUND OF THE INVENTION

Field of the Invention

The invention pertains to a method of inspecting images on printed products and involves specific defect elimination by means of classified defect types.

The technical field of the invention lies in the field of image quality control.

The primary background of the invention deals with the problem of inspecting images using an image recording system for offset printing presses as a double system for straight printing and perfecting. In this context, the invention is about providing visual feedback on detected deviations to an operator as a user on a display such as a wall screen of a printing press without impeding the operator by a representation that is too dynamic.

Two basic issues are taken into consideration:
  A reduced and simplified representation of deviations to quickly grasp the current situation even at high printing speeds should be provided.
  A graphic and/or textual feedback should be derived from the detected deviations to provide the operator with a better basis for determining what the problem is and how to handle it.

In accordance with the prior art, deviations are shown as defect images on a display; if necessary, the deviations alternate with a reference image on the display. The image recording system which is used as the inspection system merely provides the deviations as an image. It does not draw any conclusions on the deviations because the systems do not possess artificial intelligence. Thus the operator needs to inspect the defect images, interpret them, and decide on the required measures. The deviations to be represented may accumulate if multiple deviations of the same type and/or of a different type are found on the inspected print sheet.

There are obvious disadvantages to this prior art approach, among them a high data transmission load in the form of digitally recorded printed images if there are many deviations, an accumulation of changing defect representations at high printing speeds, the need for the operator to interpret all representations, and the requirement for the user to realize and interpret defect images.

In accordance with the prior art, these disadvantages are mostly counteracted by reducing the number of messages, i.e., withholding information or saving a data history to be provided to the operator as data at a later time. However, this causes a user's actions to lag behind the ongoing printing operation. A desirable outcome would be to withhold as little information as possible from the operator and nevertheless while providing a calm representation, allowing an operator to grasp the situation and act even at high speeds.

German published patent application DE 10 2017 216260 A1 discloses a method of managing unusable products in a machine for processing printing materials by means of a computer. In the course of unusable product management, sensors, in particular in the form of an image recording system including at least one image sensor, record printed images on the printed products and compare them to a digital reference and, if the recorded printed images deviate from the digital reference, the printed products that have been found to be defective are removed. The method is characterized in that unusable print profiles are created, the unusable print profiles containing parameters that are assigned specific actions and in that the specific actions are carried out as a function of the parameters for printed products that were recorded in the course of the image inspection process and deviate from the digital reference, wherein different end devices are actuated as a function of the specific actions.

Japanese Patent Application No 2005 205797 discloses an image generation device for easy and fast quality classification in accordance with the type and content of a printed product. Part of it is a printed matter inspection controller for controlling inspection of the printed matter printed by the image forming device that has document image data acquiring means and a means for acquiring inspection image data read from a printed result image formed on a sheet by the image forming device based on the document image data. In addition, there are means for recording image inspection data read from the printed image result, quality determining means for detecting defects in the image based on the document image data and on the inspection image data and for classifying qualities of the printed matter into a plurality of classes. In terms of quality determination, this means that the quality determining means can be switched to a mode for classifying the quality into an acceptable class and an unacceptable class and a mode for classifying the quality into an acceptable class, a defective class, and an intermediate quality class.

The prior art, however, does not disclose any classification of specific detected print defects in terms of defect types. Therefore, a targeted elimination of potential defect causes on the basis of print defects that have been detected in the image inspection process is impossible.

BRIEF SUMMARY OF THE INVENTION

It is accordingly an object of the invention to provide an inspection method which overcomes the above-mentioned disadvantages of the heretofore-known devices and methods of this general type and which provides for a method of inspecting images for printing machines and to provide a more efficient elimination of detected print defects by inspecting and classifying printed images.

With the above and other objects in view there is provided, in accordance with the invention, a method of inspecting images on printed products by a computer in a machine for processing printing substrates, the method which comprises:

recording and digitizing printed products with at least one image sensor of an image inspection system to generate recorded printed images in an image inspection process;

comparing the recorded printed images with a digital reference image by the computer and, if deviations are found between the recorded printed images and the digital reference image, removing the printed products that have been found to be defective; and causing the computer to analyze the deviations found in the course of the image inspection process and further data from other system parts and from the machine as detected defects, to determine specific defect classes and defect causes thereof based on the detected defects by machine learning processes, to assign the defects found in the image inspection process to the defect classes in a corresponding way, and to display the classified detected defects with the respective defect classes and causes to an operator of the machine to enable the operator to initiate specific measures to eliminate the defect causes.

In other words, the objects of the invention are attained by a method of inspecting images on printed products by means of a computer in a machine for processing printing substrates wherein the produced printed products are recorded and digitized in the course of the image inspection process by at least one image sensor of an image recording system, wherein the computer compares the digitized image data to a digital reference image and removes the printed products that have been found to be defective due to deviations between the recorded image data and the digital reference image, and wherein the computer analyzes the deviations found in the course of the image inspection process as well as further data from other system parts and from the machine as detected defects, determines specific defect classes and the causes thereof based on the defects by means of machine learning processes, assigns the defects found in the image inspection process to the defect classes in a corresponding way, and displays the classified detected defects with their defect classes and causes to an operator of the machine by means of a display for the operator to initiate specific measures to eliminate the defect causes. Thus a significant difference to prior art methods is that the method of the invention determines print defect types and causes thereof on the basis of the detected image defects, classifies them, and assigns the detected defects to the print defect types. The latter may then be displayed to an operator of the machine on a display in a corresponding way, allowing the operator immediately and efficiently to eliminate the corresponding print defects based on the knowledge of the detected image defects and thus print defects and the causes thereof.

A preferred further development of the method of the invention in this context is that the computer displays the defects that have been classified in this way in groups and superimposes them onto the digital reference image as a group to be displayed to the operator on the display. This efficient way of displaying the detected and classified defects to the operator on the display saves a massive amount of time since the operator does not have to look at each individual defect separately to assess which print defect might potentially have caused the detected defect and individually to initiate corresponding measures; instead, the operator immediately sees a copy of all image defects that might be caused by a specific class of print defects and is consequently able immediately to assess how severely the corresponding print defects affect the quality of the image and immediately and efficiently to eliminate them as far as this is in his powers.

In accordance with an added feature of the invention, for every defect class, an icon or key word is provided on the display to disclose the defect class to the operator and the group of individual classified defects is displayed to the operator in connection with the icon or key word. The icon or key word is preferably shown at the margin of the display and may light up, for instance, while the group of correspondingly classified image/print defects is simultaneously shown on the display. If an icon is used, it goes without saying that the operator needs to have some sort of explanation to understand the meaning of the individual icons.

A further preferred further development of the method of the invention in this context is that the computer displays the detected classified defects as a group in the digital reference image with a location reference. This means that the group of detected image/print defects is marked everywhere at the precise location in the digital reference image on the display where the defects have been detected by means of the image inspection device and the method carried out by the latter.

In accordance with a further development of the method the defect classes comprise typical problems inherent in the printing operation such as foreign objects, smearing, bent paper edges, register measurement, color measurement, monitoring of defective nozzles in a digital machine and white lines in the printed image. The defect classes that are used should be limited to problems inherent in the printing operation such as the ones mentioned above since the operator of the printing machine is in particular capable of eliminating these types of print/image defects. Further types of detected defects that for instance result from a wrong configuration of the image recording system used in the image inspection process should be displayed to the operator on the display by the image recording system in a different way.

A further preferred further development of the method of the invention in this context is that the computer derives a suggestion for a reaction from the specified defect class and the determined cause and displays the suggestion to the operator on the display; after manual evaluation of the suggestion, the operator may then put the suggestion into practice. In a further development of the method of the invention, once the computer has determined a cause for the image/print defect that has occurred, the computer may offer a suggestion for a corresponding remedy that the operator should implement after evaluating the suggestion. This provides assistance in particular to inexperienced operators in terms of a quick and efficient elimination of defects.

It is a further preferred further development of the method of invention in this context that the computer derives a suggestion for a reaction from the specified defect class and the determined cause and implements the suggestion in an automated way. In addition to displaying a suggestion for a reaction to eliminate a defect to the operators on the display for the operators act upon the suggestion themselves after evaluation, in addition it is likewise possible for the computer automatically to eliminate specific types of defects if the type of defect in question is suitable for automated elimination. For this to be possible, the computer obviously needs to have access to the control unit of the printing machine or needs to be identical with the control unit of the printing machine. A combination of both ways to proceed is likewise conceivable. For instance, defect types that are suited for automated elimination may be eliminated by the computer in an automated way whereas defect types that an operator needs to eliminate manually are handled in that the computer displays a suggestion for a reaction to the operator on the display.

In accordance with yet another development of the invention the computer records data on the classified defects, statistically analyzes them, derives suggestions on how to avoid defects from them, and displays them to the operator on the display; after a manual assessment, the operator may then implement or disregard them. This is a further alternative way to proceed; here, the computer makes a statistical analysis of the available data on classified defects and deduces suggestions on how to avoid defects from the statistical analysis instead of selecting a specific suggestion on a reaction from the database on the basis of the determined defect cause. This process may likewise be chosen in addition or as an alternative to the two afore-mentioned processes.

A further preferred further development of the method of the invention in this context is that the classification of the defects by the computer is a function of parameters that are initially defined by default values in the factory settings and may then be trained or adapted by the computer in the course of the image inspection process. This means that the machine learning processes by means of which the specific defect types and their causes are determined are initially defined in terms of their used parameters by default values in the factory settings. As the method of the invention is implemented, however, the system is trained with new data to improve the operation of the method of the invention or even to make the operation of the method of the invention possible.

In accordance with a concomitant feature of the invention, the parameters are trained by the computer by changing the presettings on the machine, adapting the parameters via the print job data, accessing a central database, or interacting with the operator. These are merely the most common options; other types of adaptation/training of the parameters that are used are conceivable. An additional advantage of referring to a central database is that empirical values obtained from other printing machines that are used may be factored in.

Other features which are considered as characteristic for the invention are set forth in the appended claims.

Although the invention is illustrated and described herein as embodied in an inspection method with defect classification, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
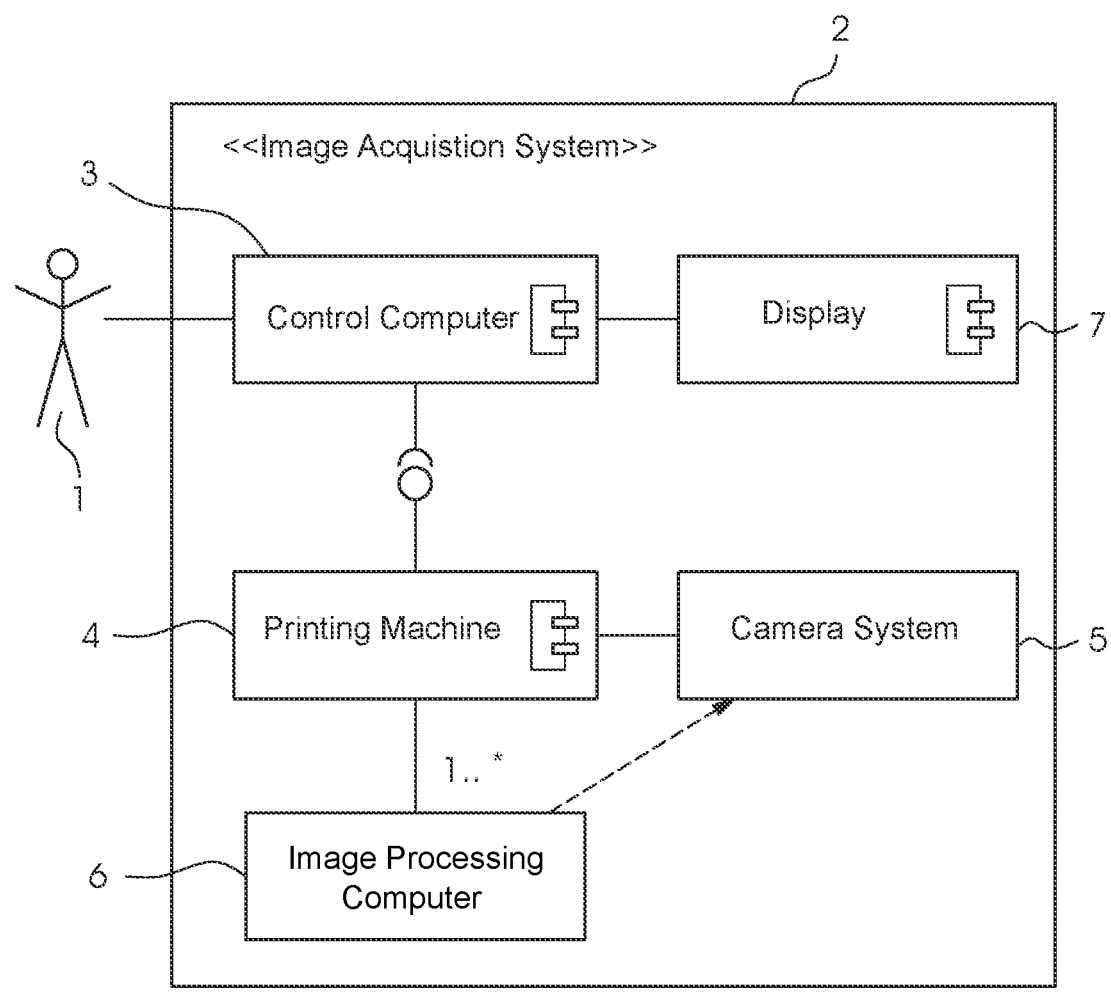
FIG. 1 diagram of the structure and design of an image recording system according to the invention.

Referring now to the figures of the drawing in detail and first, in particular, to FIG. 1 thereof, there is shown an exemplary embodiment of an image recording system 2 implementing the method of the invention. The system comprises at least one image sensor 5, usually a camera 5, which is integrated into a sheet-fed printing machine 4. The at least one camera 5 acquires, records the printed images generated by the printing machine 4 and transmits the data to a computer 3, 6 for analysis. This computer 3, 6 may be a separate computer 6, for instance one or more dedicated image processors 6, or it may be identical with the control unit 3 of the printing machine 4. At least the control unit 3 of the printing machine 4 has a display 3 for displaying the results of the image inspection process to an operator 1.

Figure 3:
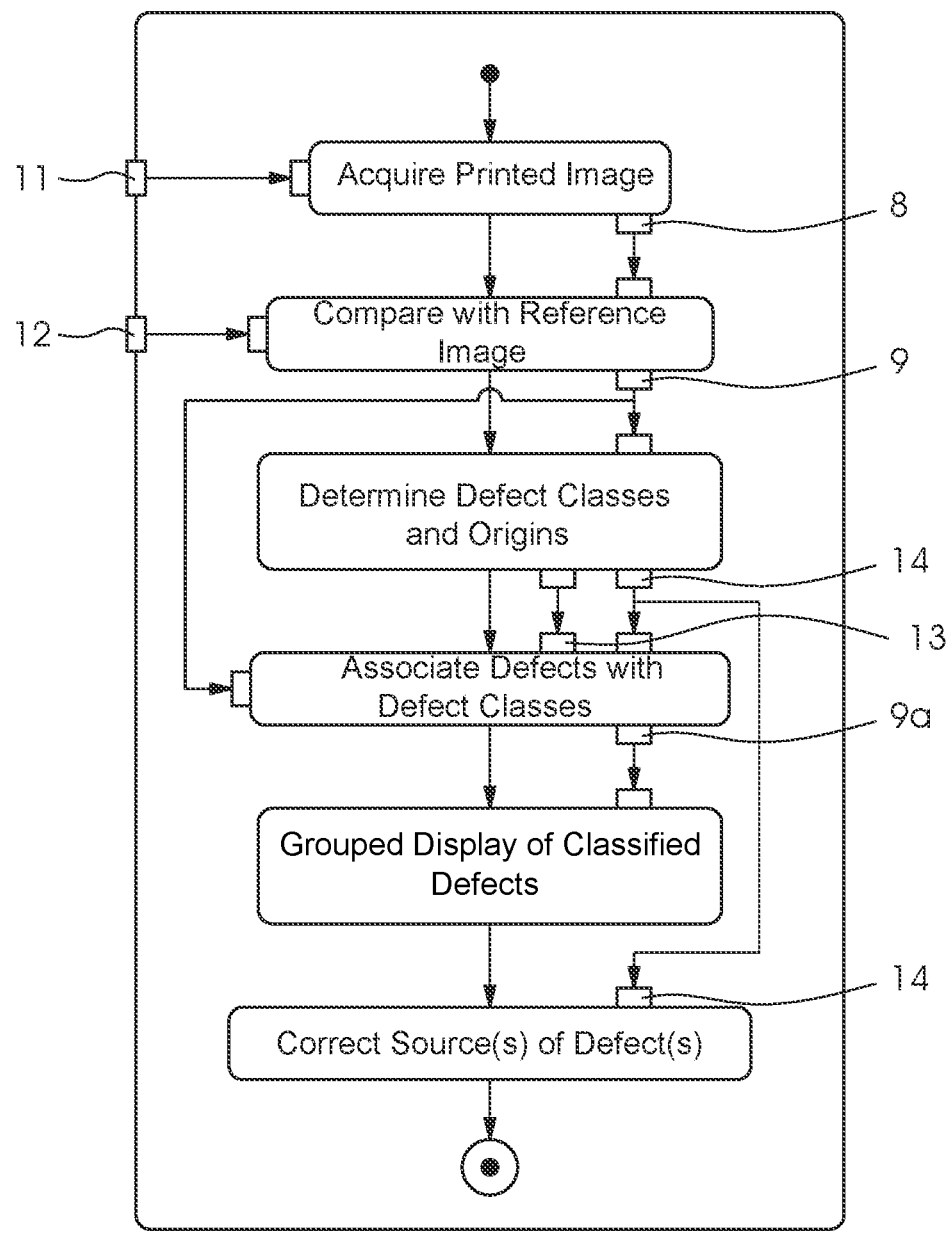
FIG. 3 is a flow chart of the method of the invention.

FIG. 3 is a flow chart of a preferred exemplary embodiment of the method of the invention. In a first step, an image recording system 2 compares a printed sheet with a copy 11 that has been digitized to form a digitized printed image 8 with a digital reference 12. In this process, deviations occur; as detected print defects 9, they may be described by a number of parameters/characteristics such as their size,
their position,
their color,
their shape,
other characteristics that may be derived from further image processing operations,
their behavior over time, for instance the number of sheets the defect is found in (repetitive defect, rhythms), whether they move or change their size or color or the like on a higher plane: grouping of defects such as increased smearing, in accordance with proximity in terms of place/time, type, other characteristics . . . .

The image recording system 2 then uses these characteristics to calculate a classification of individual defects 9 or defect groups. The classification is done using suitable machine learning processes. The detected defect classes 13 describe typical problems inherent in the printing process such as foreign objects, smearing, bent paper edges etc. that are the defect causes 14 of these defects.

Further defect classes 13 may be triggered by other program parts and analyzing processes in the image recording system 2 such as register measurement, color measurement, defective nozzle monitoring in a digital printing machine, white lines etc.

Figure 2:
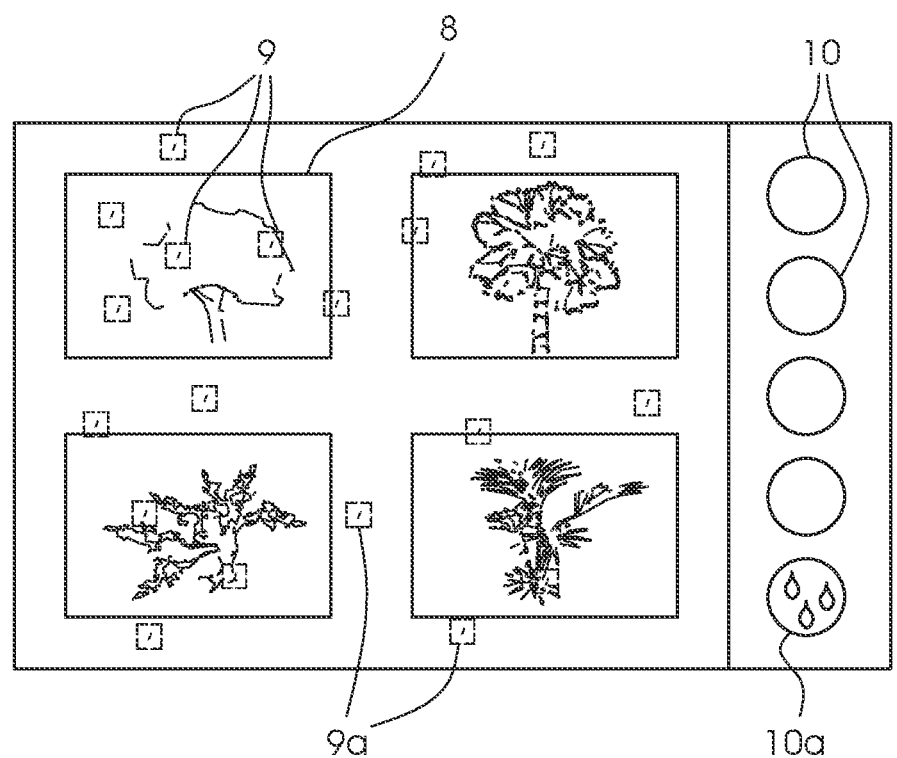
FIG. 2 illustrates an example of how grouped defects of a defect class may be displayed.

In the next step, the defect classes 13 may be used for various further actions. These include:

a) Displaying—if defects 9 may be assigned to distinct defect classes 13, these classes 13 are displayed on the graphical user interface (GUI). FIG. 2 shows an example of such a user interface. Detected defects 9 are marked in a suitable way on the display. Various icons 10 representing different defect classes 13 are presented for selection on the right-hand side of the GUI. When a specific icon 10a is selected—in the figure, it is icon 10a representing foreign object defects, for instance—grouped defects classified as foreign object defects 9a are shown. The grouping may be implemented by only indicating the corresponding defects 9a or only marking these defects 9a in a specific color or by a specific frame etc. Defects 9 that could not be classified continue to be shown as a simple defect image/rectangle in the overview image or the like or as a class of their own ("other").

b) A suggestion for a remedy: The machine 4, or, to be more precise, the computer 3, 6, may try to derive a suggestion for a reaction from the defect class 13, for instance washing, and, if successful, display the suggestion to the operator 1, thus to eliminate the defect cause 14. The action may be initiated after manual examination of the suggestion.

c) An automated remedy: At a later point, based on classified defects 9a, the method may be extended to include an automated reaction to the defect 9a by the machine 4 to eliminate the defect cause 14, for instance color control, water balance control, washing, etc.

d) "Big data": The data on such classified defects 9a, for instance frequencies of occurrence etc., may be used for further statistical analysis, for instance to avoid defects, monitor the machine, purchase spare parts in advance, improve the pre-settings of the machine 4.

The classification and processing in the various steps described above may be influenced by parameters. Initially, default parameters are defined for every machine 4 as it is delivered to the customer. They may then be further adapted/ trained individually in various ways, for instance by changing the pre-settings/parameters of an individual machine 4, adapting the parameters via the job information, adapting the parameters centrally/for the entire print shop, for instance in a database, potentially, a semi-automated classification may be made, in which the operator 1 may assess the classifications determined by the system, i.e. may confirm or reject them. The classification process is thus further trained by the classifications of the operator 1 and may thus continually provide better and better assistance to reduce the operator's workload.

Instead of an icon 10, 10*a*, or in addition, text may appear linguistically to enhance the displayed information as an interpretation of the deviations. Nevertheless, people can grasp images in the form of icons 10, 10*a* faster than text. Text needs to be read and understood first. In addition, images are clear in all languages whereas text needs to be translated and may result in wrong or modified contents.

In a nutshell, the method of the invention has the following effect: the image recording system 2 analyzes the images 11 on the sheet. A subsequent process analyzes the deviations 9 with its features that have been found as well as further data from further system components and from the machine 4 and, based on this information, tries to classify the deviations 9 manually and/or using machine learning processes, and/or to group the defects 9. The information obtained in this way is used to simplify the display 7 for the operator 1. For instance, instead of displaying individual defect images for multiple foreign object defects on the printed sheet, the defects may be displayed as a group by a symbol 10*a* that is meaningful to the operator. Then it is sufficient to indicate the hits in a reference image 12 as locations in connection with an icon 10, 10*a* as a representative.

This process has a number of advantages:

Print deviations from a defined reference 12 may be realized more quickly.

The display 7 is less dynamic yet no information is lost.

The data load is reduced because there are fewer images in real time.

The operator's workload is reduced, in particular at high speeds.

On the basis of the data, automated reactions may be implemented and automated adjustments may be made to the machine 4 to eliminate the defect(s) 9 in the future.

The accumulated data may then be used to learn how the system may autonomously control print quality as an assistant for future developments.

The following is a summary list of reference numerals and the corresponding structure used in the above description of the invention:

1 operator
2 image recording system
3 control unit
4 printing machine
5 image sensor
6 image processor
7 display
8 digitized printed image/copy
9 detected print defects
9*a* classified print defects
10 icons with defect class
10*a* icon with specific defect class
11 printed image/copy
12 digital reference/good image
13 defect classes
14 defect causes

The invention claimed is:

1. A method of inspecting images on printed products by a computer in a machine for processing printing substrates, the method which comprises:

recording and digitizing printed products with at least one image sensor of an image inspection system to generate recorded printed images in an image inspection process;

comparing the recorded printed images with a digital reference image by the computer and, if deviations are found between the recorded printed images and the digital reference image, removing the printed products that have been found to be defective; and causing the computer to analyze the deviations found in the course of the image inspection process and further data from other system parts and from the machine as detected defects, to determine specific defect classes and defect causes thereof based on the detected defects by machine learning processes, to assign the defects found in the image inspection process to the defect classes in a corresponding way, and to display the classified detected defects with the respective defect classes and causes to an operator of the machine to enable the operator to initiate specific measures to eliminate the defect causes.

2. The method according to claim 1, which comprises causing the computer to superimpose the defects that have been classified as a group onto the digital reference image and display the defects superimposed on the reference image to the operator of the machine on a display.

3. The method according to claim 2, which comprises providing for every defect class an icon or key word on the display to disclose the defect class to the operator and displaying the group of individual classified defects to the operator in combination with the respective icon or key word.

4. The method according to claim 2, which comprises displaying with the computer the detected classified defects as a group with a local reference in the digital reference image.

5. The method according to claim 1, wherein the defect classes comprise typical problems inherent in a printing process.

6. The method according to claim 5, wherein the typical problems are selected from the group consisting of foreign objects, smearing, bent paper edges, register measurement, color measurement, monitoring of defective nozzles in a digital printing machine, and white lines in the printed image.

7. The method according to claim 1, which comprises causing the computer to derive from the specific defect class and from the determined cause a suggestion for a reaction and to display the suggestion to the operator on a display, whereupon the operator implements the suggestion after manual assessment.

8. The method according to claim 1, which comprises causing the computer to derive a suggestion for a reaction from the specific defect class and from the determined cause and to automatically put the reaction into practice.

9. The method according to claim 1, which comprises causing the computer to record data on the classified defects, to statistically analyze the data, to derive suggestions on how to avoid defects from the data, and to display the suggestions to the operator on a display for the operator to implement or dismiss the suggestions after manual assessment.

10. The method according to claim 1, wherein the classification of the defects by the computer is dependent on parameters that are initially defined by default factory values when the machine is delivered and are subsequently trained by the computer in the course of the image inspection process.

11. The method according to claim 10, wherein the parameters are trained by the computer by changing the presettings on the machine, by adapting the parameters via print job data, by accessing a central database, or by interacting with the operator.

* * * * *